Jan. 9, 1973 V. PERUCCA Re. 27,542

HIGH SPEED SERIAL PRINTING DEVICE FOR TELEPRINTERS, ACCOUNTING MACHINES AND DATA PROCESSING EQUIPMENT

Original Filed March 31, 1967 5 Sheets-Sheet 1

INVENTOR.
VINCENZO PERUCCA

BY John Toggenburger
AGENT

HIGH SPEED SERIAL PRINTING DEVICE FOR TELEPRINTERS, ACCOUNTING MACHINES AND DATA PROCESSING EQUIPMENT

Original Filed March 31, 1967 5 Sheets-Sheet 2

INVENTOR.
VINCENZO PERUCCA

BY John Toggenburger
AGENT

INVENTOR.
VINCENZO PERUCCA
BY John Toggenburger
AGENT

INVENTOR.
VINCENZO PERUCCA
BY John Toggenburger
AGENT

HIGH SPEED SERIAL PRINTING DEVICE FOR TELEPRINTERS, ACCOUNTING MACHINES AND DATA PROCESSING EQUIPTMENT

Filed April 29, 1970 5 Sheets-Sheet 5

INVENTOR.
VINCENZO PERUCCA

BY John Toggenburger
AGENT

United States Patent Office

Re. 27,542
Reissued Jan. 9, 1973

27,542

HIGH SPEED SERIAL PRINTING DEVICE FOR TELEPRINTERS, ACCOUNTING MACHINES AND DATA PROCESSING EQUIPMENT

Vincenzo Perucca, Ivrea, Italy, assignor to Ing. C. Olivetti & C., S.p.A., Ivrea, Italy Original No. 3,415,184, dated Dec. 10, 1968, Ser. No. 627,443, Mar. 31, 1967. Application for reissue Apr. 29, 1970, Ser. No. 32,790
Int. Cl. B41j *9/02, 1/34*
U.S. Cl. 101—93 C 14 Claims

Matter enclosed in heavy brackets [ ] appears in the original patent but forms no part of this reissue specification; matter printed in italics indicates the additions made by reissue.

ABSTRACT OF THE DISCLOSURE

A serial printing device comprises a horizontally continuously rotating typewheel cooperating with a hammer so wide as to engage during each revolution of the typewheel any type to effect a flying printing in a constant point of the paper, despite a continuous mutual letter spacing movement. The typewheel comprises a sector devoid of types, whereas the other sector is provided with the types arranged at a variable mutual distance. The hammer is cushioned by a stack of plates. The typewheel may cooperate with more than one hammer or may be caused to print both during the advancing and the return stroke of a carriage.

BACKGROUND OF THE INVENTION

This invention relates to a high speed serial printing device for teleprinters, accounting machines, and data processing equipments, comprising a typewheel continuously rotating on a substantially vertical axis, a hammer selectively operable to effect a flying printing of a selected type of said typewheel, a frame for mounting said typewheel and said hammer in an aligned transverse relationship, and feeding means for causing the paper and said frame to be relatively letter spaced.

There are known several flying printing devices, wherein the typewheels are rotatable on a horizontal shaft. Since the types are generally higher than wide, these typewheels have a large diameter, whereby the speed of the device, due to the centrifugal force of the typewheel, is relatively limited.

It is also known a serial printing device wherein a type drum is provided with a plurality of parallel rows of types, while the hammer is transversely displaced stepwise. The type drum is very expensive, while its speed cannot exceed the speed of a typewheel rotatable on a horizontal shaft.

SUMMARY OF THE INVENTION

These and other disadvantages are obviated by the high speed serial printing device according to the invention, which is characterized in that said typewheel comprises a first sector bearing a set of types arranged substantially parallel to said axis, and another sector devoid of types, and in that means connected to said typewheel enable said feeding means to effect at a constant speed a feeding movement at least equal to one letter space during one revolution of said typewheel, said hammer being operated concomitantly with a selected pulse generated by a timing disk rotatable synchronously with said typewheel and adapted to generate in association with each type of said typewheel a specifically timed operating pulse so as to cause said hammer to strike the progressively more trailing types in respect to the leading type of said first sector at progressively displaced positions with respect to said hammer in the advancing direction of said paper to print during each revolution of said typewheel any type in the range of a predetermined letter space of said paper, even if said paper is effecting said constant speed feeding movement for being letter spaced.

This and other characteristics of the invention will become apparent from the following description of two preferred embodiments thereof, and from the accompanying drawings.

DESCRIPTION OF THE PREFERRED EMBODIMENTS OF THE INVENTION

Figure 1:
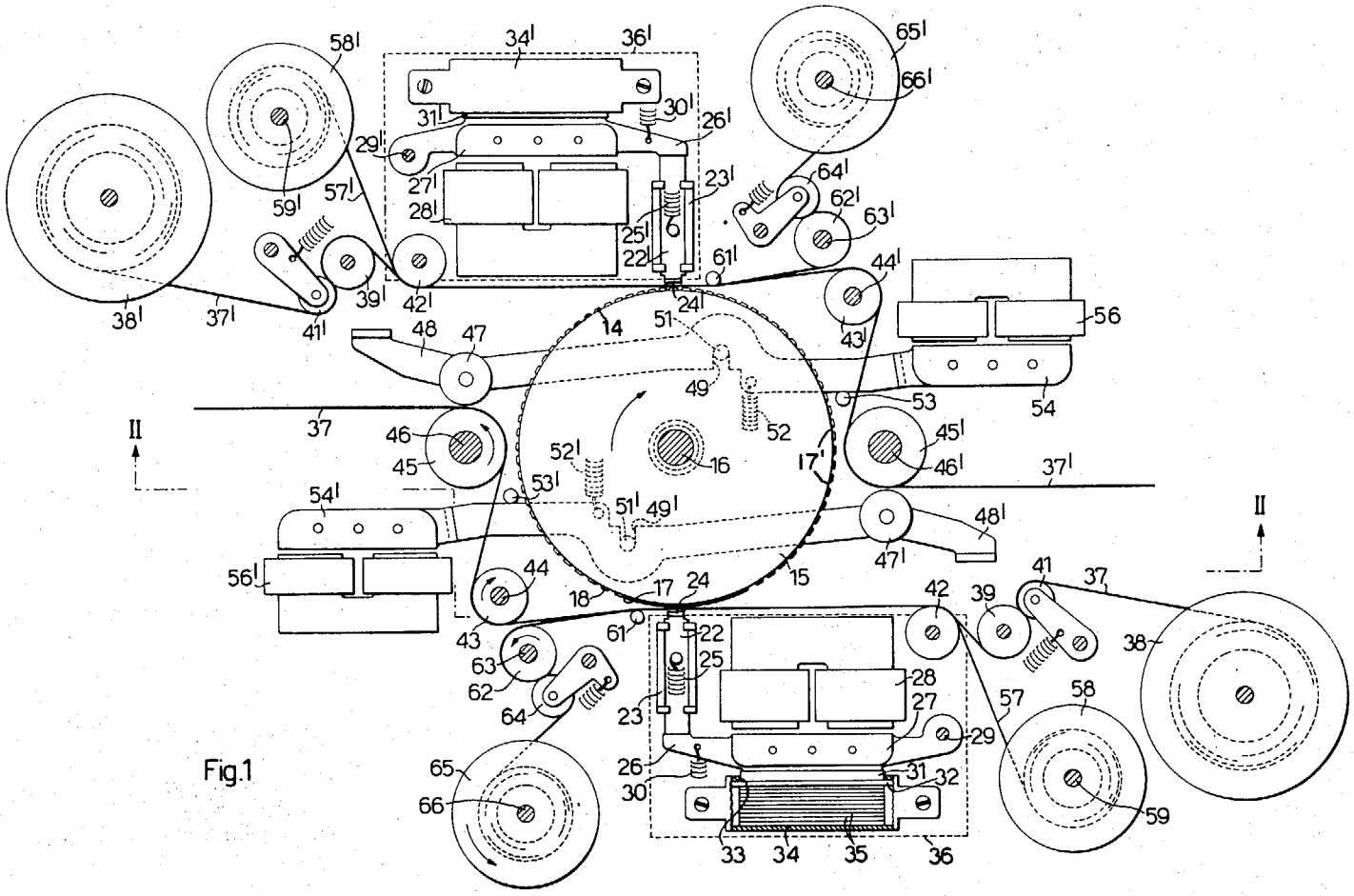
FIG. 1 is a partial plan view of a first embodiment of the serial printing device according to the invention.

According to a first embodiment of the invention the high speed serial printing device comprises a typewheel 15 (FIG. 1) secured to a vertical shaft 16 continuously rotated clockwise by an electric motor not shown in the drawings. The wheel 15 is provided with a first major sector 14 bearing sixty-four types 18 peripherally arranged parallel to the shaft 16 and interspersed with void 17', and with a second minor sector 17 devoid of types and having a predetermined circumferential expanse commensurate in a manner which will be disclosed later.

Secured to the shaft 16 is also a disk 19 (FIG. 3) provided with pulse generating elements or holes 20 arbe in a constant transverse relationship with the type-18 (FIG. 2) in a manner to be described and adapted to generate in cooperation with a photocell 21 a specifically timed pulse in association with each type 18 of the typewheel 15. The disk 19 is provided with another hole 55 adapted to generate in cooperation with a photocell 60 a starting pulse determining the beginning of a printing operation.

The printing device comprises also a hammer 22 (FIG. 1) adapted to cooperate with the typewheel 15 for effecting a flying printing of a selected type 18. The hammer 22 is slidably mounted on a stationary guide 23 so as to be in a constant transverse relaionship with the typewheel 15 and is provided with a striking face 24 arcuate according to the radius of the typewheel 15.

The hammer 22 is urged by a spring 25 to normally contact a projection 26 of an armature 27 of a normally deenergized electromagnet 28. The armature 27 is fulcrumed on a stationary pivot 29 and is urged by a spring 30 to normally contact a projecting portion 31 of a plate 32 projecting from an opening 33 of a stationary box 34. Housed in the box 34 is a stack of substantially flat rectangular metallic plates 35.

Since the plates 35 are never prefectly plane, a gap remains between the adjacent plates 35, which operate as leaf springs. The plates 35 are particularly adapted to cushion the shock and quickly reduce the vibrations of the armature 27 due to the yieldable impact produced upon deenergization of the electromagnet 28, ths reducing the time required for restoration of the armature 27 and the hammer 22. The hammer 22, the electromagnet 28, the armature 27 and the box 34, are housed in a removable container 36 indicated by a broken line in FIG. 1.

Furthermore, the printing device comprises feeding means for a paper tape 37 that unwinds from a reel 38. The tape 37 firstly passes between a pair of idle rollers 39 and 41, and then is guided by another idle roller 42 to pass between the typewheel 15 and the hammer 22. Finally, the tape 37 is guided by a further roller 43 secured to a shaft 44 rotatable on the stationary machine frame and is wound on a feeding roller 45 secured to another rotatable shaft 46. The roller 45 cooperates with a pressing roller 47 fulcrumed on a lever 48 provided with a notch 49 engaging a stationary pin 51. The lever 48 is urged by a spring 52 to normally contact both the pin 51 and a stationary member 53. Secured to an end of the lever 48 is an armature 54 of a second electromagnet 56 adapted to be energized for controlling the beginning of the printing operation. Particularly the electromagnet 56 when energized also controls the energization of the electromagnet 28 in a manner known per se.

Figure 3:
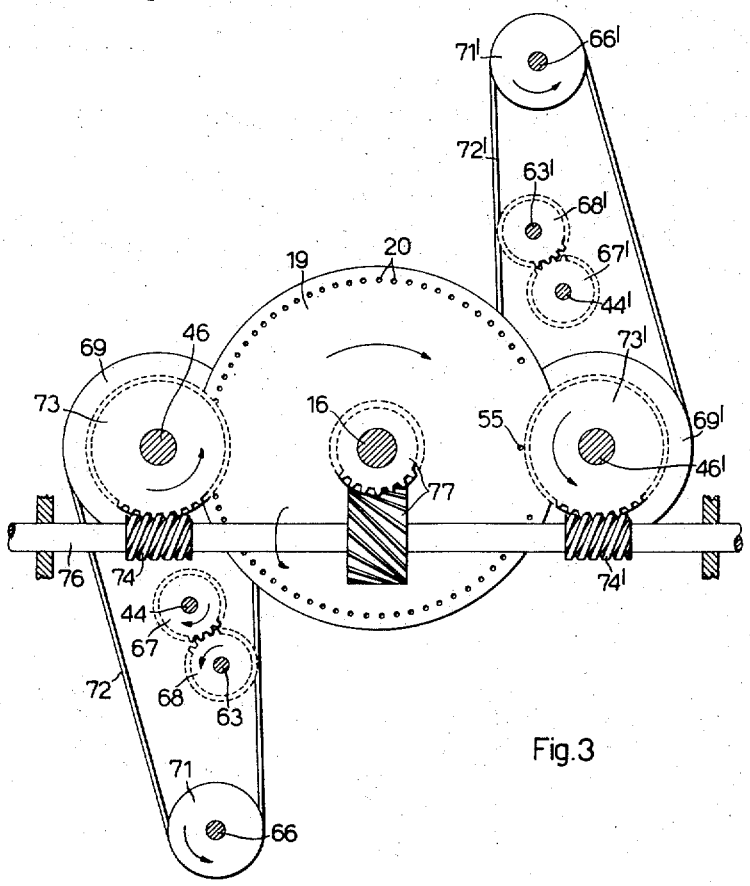
FIG. 3 is a partial sectional view according to the line III—III of FIG. 2.

Between the paper tape 37 and the hammer 22 passes an ink ribbon 57, which is unwound from a spool 58 idle on a shaft 59 and is guided by the roller 42 and by a stationary pin 61. Then the ink ribbon 57 passes between a roller 62 secured to a shaft 63 rotatable on the machine frame and a pressing roller 64. Secured to the two shafts 44 and 63 are two intermeshing pinions 67 and 68 (FIG. 3). Finally the ink ribbon 57 is wound up by a spool 65 frictionally driven by a shaft 66 rotatable on the machine frame.

Secured to the shaft 46 is a pulley 69 connected by a belt 72 to another pulley 71 secured to the shaft 66. Secured to the shaft 46 is also a worm gear 73 meshing with a worm 74 secured to a horizontal shaft 76 rotatable on the machine frame. The shaft 76 is continuously rotated by the shaft 16 of the typewheel 15 through a pair of intermeshing worm gears 77.

The circumferential expanse of the sector 17 is the minimum possible commensurate to the time required by the hammer 22 to be restored upon operation, taking into account the rotating speed of the typewheel 15. More particularly, the hammer 22 upon striking a type requires for being restored a predetermined time depending from the physical characteristics of the hammer 22, the springs 25, 30, the electromagnet 28 and the cushioning plates 35. The angular expanse of the sector 17 is equal to the product of the angular speed of the typewheel 15 by the above restoring time, so that in the case the last type 18 is printed during one revolution of the typewheel 15, the hammer 22 will be ready for printing the first type in the next following revolution of the typewheel 15.

The width of the striking face 24 of the hammer 22 is wider than one type 18 and less than one type plus the adjacent voids 17' as to engage during each revolution of the typewheel 15 the entire printing face of a selected type 18 without affecting the adjacent types 18. Furthermore, ratio between the width of the striking face 24 and the letter space is equal to the ratio between the length of the sector 14 and the circumference of the typewheel 15. Furthermore, the voids 17' adjacent the various types 18 have a variable width which is always equal to the portion of the striking face 24 which by striking a type 18 remains free; the types 18 are thus symmetrically arranged in respect to the sector 17 and their adjacent voids from the leading type 18 to the trailing types 18 of the sector 14 have a width which is firstly decreasing and then increasing. The types 18 are thus the most possible mutually approached, whereby the typewheel 15 may be designed with the minimum possible diameter and may be rotated at a very high angular speed.

The printing device of FIGS. 1–3 operates as follows.

The printing device is controlled in a known manner by an apparatus adapted to serially supply signals corresponding to the characters to be printed, for example a teleprinter receiving apparatus, an electronic calculator, an accounting machine, or a data processing equipment in general. Normally the typewheel 15 is rotated clockwise bodily with the shaft 16 and the disk 19. The shaft 16 through the gears 77 (FIG. 3), the shaft 76, the worms 74, and the gears 73, rotates the shaft 46 counterclockwise bodily with the roller 45 (FIG. 1) and the pulley 69 (FIG. 3). This latter through the belt 72 and the pulley 71 rotates the shaft 66, which however normally slips in respect to the spool 65 (FIG. 1).

When a start signal is generated, in concomitance with a pulse generated by the photocell 60 upon reading the hole 55 of the disk 19, the electromagnet 56 is energized in a known manner. The electromagnet 56 attracts the armature 54, which firstly rocks the lever 48 around the pin 51, until the roller 47 bears against the feeding roller 45, thus pinching the tape 37 between the rollers 45 and 47. Thereafter the lever 48 is rocked around the contacting point of the rollers 45 and 47, until the armature 54 bears against the core of the electromagnet 56. The tape 37 is yieldably pinched between the rollers 45 and 47 by the action of the spring 52 and is fed leftwards at such a speed as to cover a letter space during each revolution of the typewheel 15. The tape 37 while advancing causes the roller 43 to rotate clockwise bodily with the pinion 67 (FIG. 3). This latter rotates the pinion 68 counterclockwise bodily with the roller 62 (FIG. 1), which causes the ink ribbon 57 to be advanced leftwards. The ribbon 57 is now wound up on the spool 65 which is frictionally driven by the shaft 66.

Figure 4:
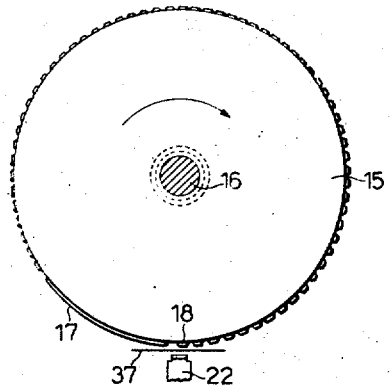
FIGS. 4, 5, 6 and 7 represent a diagrammatic view of the device of FIG. 1, in four different operated positions.

Furthermore, the electromagnet 56 predisposes in a known manner the electromagnet 28 to be energized during each revolution of the typewheel 15 by the signal corresponding to the character to be printed in concomitance with the pulse generated by the photocell 21 (FIG. 2) upon reading the hole 20 of the disk 19 corresponding to the character to be printed. Particularly, the holes of the disk 19 are so located as to enable the hammer face 24 to strike the various types 18 with portions distanced proportionally to the distance between the types. Therefore, the progressively more trailing types 18 in respect to the leading type 18 of the sector 14 are struck at progressively displaced positions in the advancing direction of the paper 37 with respect to the hammer face 24, so that the corresponding character is printed in a predetermined letter space of the paper, even if the paper is effecting the constant feeding movement for being letter spaced. Therefore, if the character to be printed is that of the first type 18 (FIG. 1) passing in front of the hammer 22 after the portion 17, the corresponding hole 20 of the disk 19 causes the hammer 22 to strike in the instant in which the typewheel 15 is located in the position of FIG. 4, that is with the type 18 at the right end of the striking face 24 of the hammer 22. At this instant the tape 37 presents also the printing point in front of the right hand portion of the striking face 24. The space between the first type 18 and the sector 17 is such as to prevent the striking face 24 from engaging beside the type 18 also the portion 17.

Figure 5:
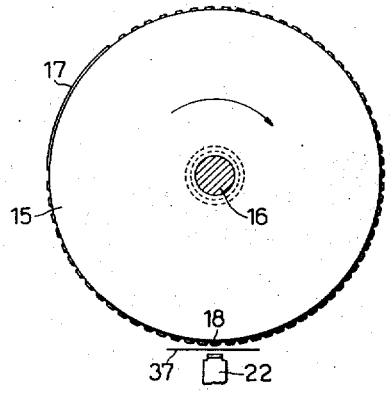
Figure 6:
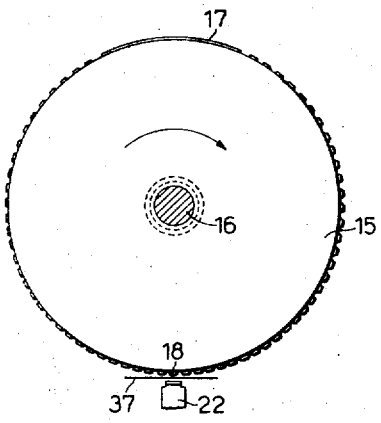
Figure 7:
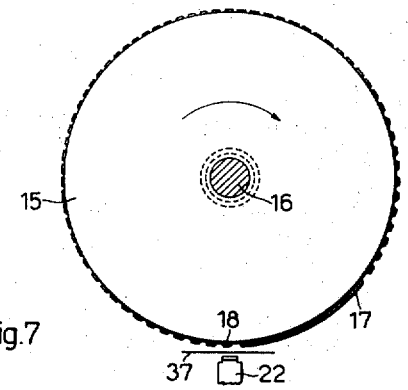

If the character to be printed is that of an intermediate type 18 as shown in FIG. 5, since the tape 37 has in the meanwhile displaced leftward the printing point, the corresponding hole 20 (FIG. 3) of the disk 19 causes the hammer 22 to strike in the instant the type 18 in front of the striking face 24 (FIG. 5) at a distance from its right hand end which is proportional to the distance of the type 18 to be printed from the first type 18 next following the sector 17. Particularly, if the character to be printed is that of the central type 18 (FIG. 6), the hammer 22 strikes the type 18 when this latter is centered with respect to the striking face 24. Finally, if the character to be printed in that of the last type 18 as shown in FIG. 7, the hammer 22 strikes the type 18 in the instant the type 18 is located at the left hand end of the striking face 24.

In any case immediately after each striking operation the electromagnet 28 (FIG. 1) becomes deenergized and the spring 30 restores the armature 27, while the spring 25 restores the hammer 22. The shock of the armature 27 and of the hammer 22 is cushioned and their possible vibrations when restored are quickly reduced by the plates 35.

The arrangement of the typewheel 15 and of the types 18 are suitable for simultaneously printing at least two different print works. To this end the embodiment of FIGS. 1–3 comprises another hammer 22' and a feeding device for another tape 37' as well as another feeding device for a second ink ribbon 57'. The members of these devices are located symmetrically to those described in connection with the first hammer 22 and are indicated by similar primed numeral references and do not need to be described. The operation of the hammer 22' is similar to that of the hammer 22, and is controlled by the same holes 20 (FIG. 2) of the disk 19, which however are now read by a second photocell 21'.

According to another embodiment of the invention, the printing device is designed as a page printing device, for example for continuous forms. To this end the printing device comprises a carriage generically indicated by the numeral 78 (FIG. 8), which comprises a container 79 (FIG. 9) and a bar 80 connected at the two ends by two U-shaped arms 81, the container 79 is provided at its two ends with a pair of bored projections 82 (FIG. 10) transversely slidable on a stationary transverse shaft 83. Fulcrumed on a projection 84 of the bar 80 are two rollers 85 cooperating with a stationary guide bar 86.

Mounted on the container 79 of the carriage 78 is a set of four equidistant typewheels 15 (FIG. 8) each one adapted to cooperate with a corresponding hammer 22 housed in a corresponding container 36 secured to the bar 80 of the carriage 78. The typewheels 15 and the containers 36 are identical to those shown in the embodiment of FIG. 1. The printing device comprises a pair of sprocket feed devices 87 adapted to feed a continuous form, shown by broken lines in FIG. 8, in the space between the container 79 and the bar 80 and therefore between the typewheels 15 and the containers 36.

More particularly, each typewheel 15 is secured to a corresponding shaft 16 rotatably mounted on two horizontal plates 88 and 89 (FIG. 10) of the container 79. Secured to each shaft 16 is a worm gear 90 intermeshing with a similar worm gear 91 secured to a horizontal shift 92 (FIG. 9). This latter is rotatable on two side walls 190 of the container 79 and is extended leftwards on a fluted portion 93 slidable within a complementally fluted sleeve 94 rotatably mounted on the stationary machine frame. The sleeve 94, and therefore the shaft 92 (FIG. 10) is continuously rotated counterclockwise through a pulley 95 (FIG. 9) by an electric motor not shown in the drawings. Secured to the sleeve 94 is also a bored disk 96 having two rows of readable elements or holes 97 and 97' each one adapted to be read by a corresponding photoelectric cell 197 and 197'. The holes 97 are in predetermined relationship with respect to the cell 197 for causing the hammers 22 (FIG. 8) to print the selected characters while the carriage 78 effects an advancing or rightward movement, whereas the holes 97 (FIG. 5) are in predetermined relationship with respect to the cell 197'' for enabling the hammers 22 (FIG. 8) to print the selected characters while the carriage 78 effects a return or leftward movement. The disk 96 (FIG. 9) is also provided with a starting hole 198 adapted to be read by a corresponding photoelectric cell 199.

The carriage 78 is transversely slidable through a stroke which is slightly longer than the distance between two adjacent typewheels 15, each typewheel 15 being adapted to print only on one fourth of the length of the printing line. The carriage 78 is provided with a pair of pins 99 secured to the arms 81 and adapted to be engaged each one by a corresponding spring urged locking member 98 to lock yieldably the carriage 78 at each one of the two end positions of the carriage stroke.

The sleeve 94 is connected through a pair of pinions 100 to another transverse shaft 101 rotatably mounted on two side walls 191 of a second container 102 secured to the machine. The shaft 101 is provided with two portions 103 and 104 threaded on opposite directions, which may alternately be engaged by two corresponding nuts 105 and 106 secured to a shaft 107. This latter is slidable on the side walls 191 of the container 102 and is adapted to be rocked from the rest position shown in FIG. 10 alternately to a pair of oppositely rocked positions. The right hand end of the shaft 107 (FIG. 9) is connected through a nut 108 to a projection 109 of the container 79, to enable the shaft 107 to rotate with respect to the projection 109 and to be transversely bodily moved with the carriage 78 in both directions.

Figure 11:
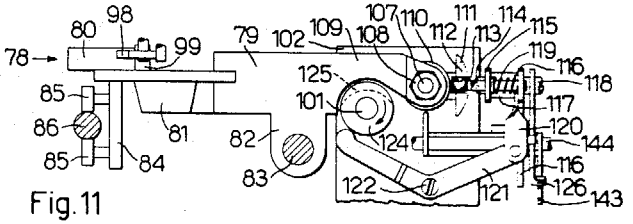
FIG. 11 is a right hand partial longitudinal sectional view of the device of FIG. 8.
Figure 12:
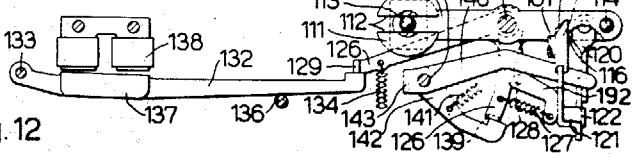
FIG. 12 is a partial sectional view according to the line XII—XII of FIG. 9.

Furthermore, secured to the shaft 107 is a hub 110 integral with a spherical member 111 having a notch 112 (FIGS. 11 and 12) adapted to alternately cooperate with the spherical end of two elements or pins 113 and 114 (FIG. 9). Each pin 113, 114 is slidably mounted on two holes provided at each end of a pair of similar swing levers 115 and 116 secured to a sleeve 117 rotatable on a stationary pivot 188. Each pin 113 and 114 is urged forward, by a corresponding compression spring 119. The lever 116 is linked through a link 120 with a lever 121 (FIG. 11) rotatably and slidably mounted on a stationary pivot 122 (FIG. 9) and normally urged rightwards by a compression spring 123. The lever 121 is adapted to cooperate with a cam 124 secured to the shaft 101, the cam 124 being provided with a bevelled portion 125.

Furthermore, fulcrumed on the pivot 118 is a lever 126 (FIG. 12) normally urged by a spring 127 to contact a pin 128 secured to an arm 192 of the lever 116. The lever 126 is also provided with a lug 129 normally urged by a spring 134 to contact a lever 132 fulcrumed on a stationary pivot 133 and normally contacting a stationary pin 136. Secured to the lever 132 is an armature 137 of an electromagnet 138. The lever 126 is provided with another lugs 139 normally contacted by an arm 142 of a bail 143, which is fulcrumed on a stationary shaft 144 and is urged counterclockwise by a spring 141. The bail 143 is provided with an arm 146 having an upper edge inclined in opposite directions and adapted to cooperate with the hub 110.

Finally, secured to the shaft 107 (FIG. 10) is a pin 148 having a spherical end 149 adapted to be guided by an axial rib 151 (FIG. 9) and two tapered projections 152 and 153 provided on the top plate 193 of the container 102. The two containers 79 and 102 are hermetically closed and the container members are oil immersed.

Figure 8:
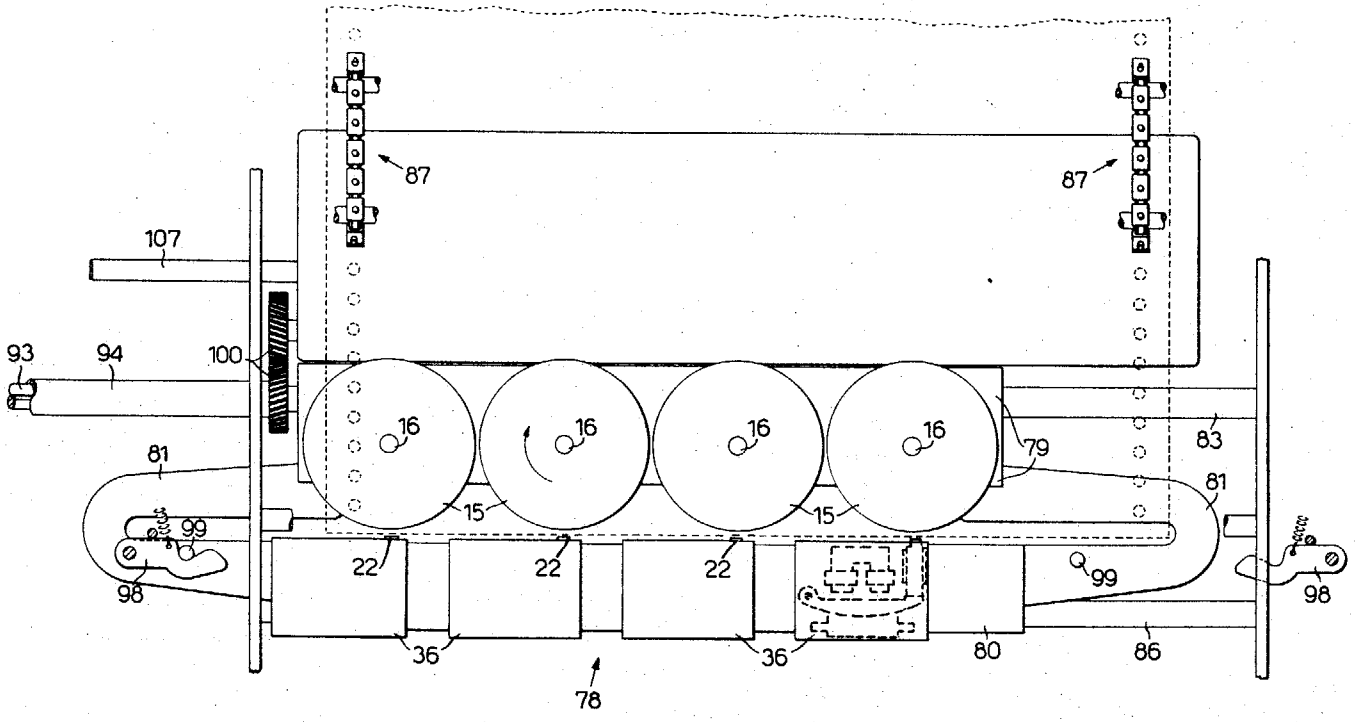
FIG. 8 is a partial plan view of a second embodiment of the printing device according to the invention.
Figure 9:
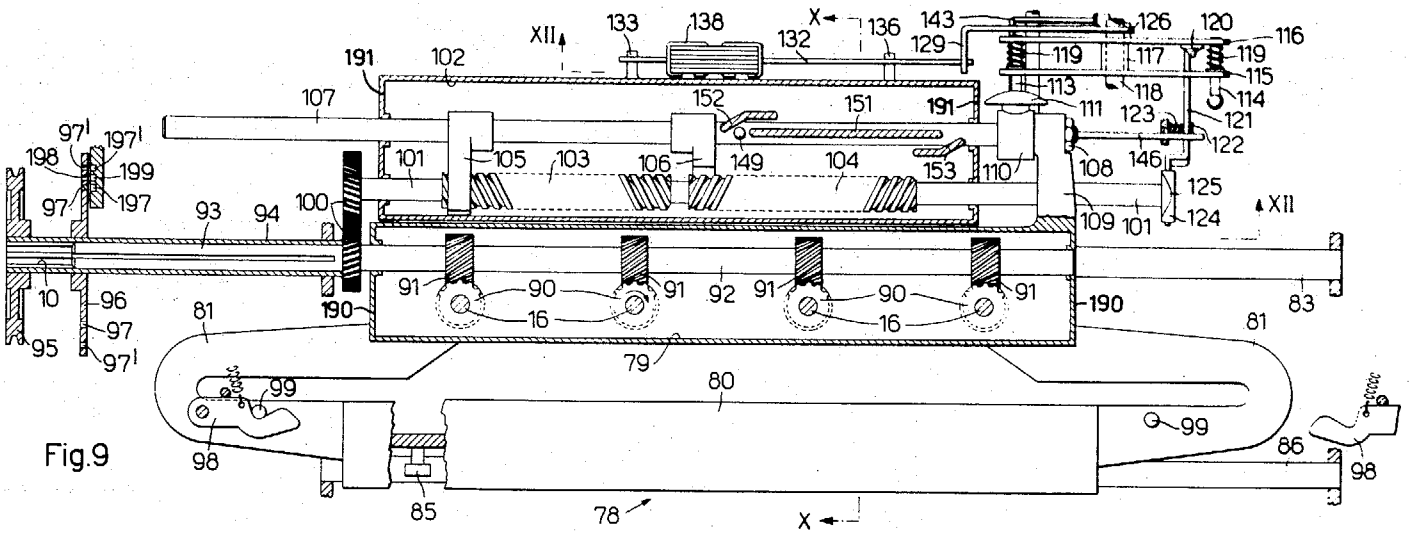
FIG. 9 is a partial sectional plan view of the embodiment of FIG. 8.
Figure 10:
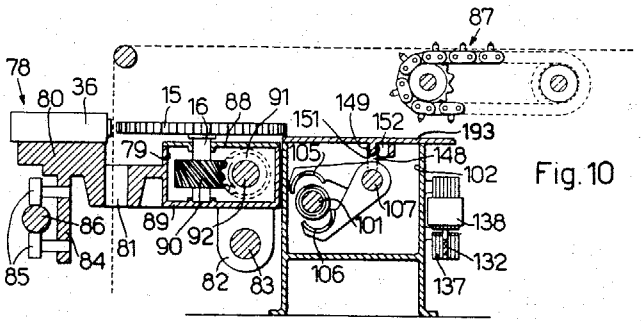
FIG. 10 is a partial sectional view according to the line X—X of FIG. 9.

The printing device of FIGS. 8–12 operates as follows:

It is assumed that the carriage 78 is standing at the left hand end of the line as shown in FIGS. 8 and 9 and the shaft 107 is located at its angular rest position wherein the two nuts 105 and 105 (FIG. 10) are both disengaged from the threaded portions 103 and 104 (FIG. 9). The notch 112 (FIG. 12) of the member 111 is engaged by the left pin 113 (FIG. 9), whereas the levers 115 and 116 (FIG. 12) are in horizontal position and the lever 122 does not contact the cam 124.

The electric motor through the pulley 95 (FIG. 9) continuously rotates the sleeve 94 bodily with the disk 96, the shaft 92 and the worm wheels 91. These latter through the worm wheels 90 continuously rotate the four ypewheels 15 (FIG. 8) clockwise. Furthermore the shaft 2 through the pinions 100 rotates the shaft 101 (FIG. 0) clockwise.

Figure 2:
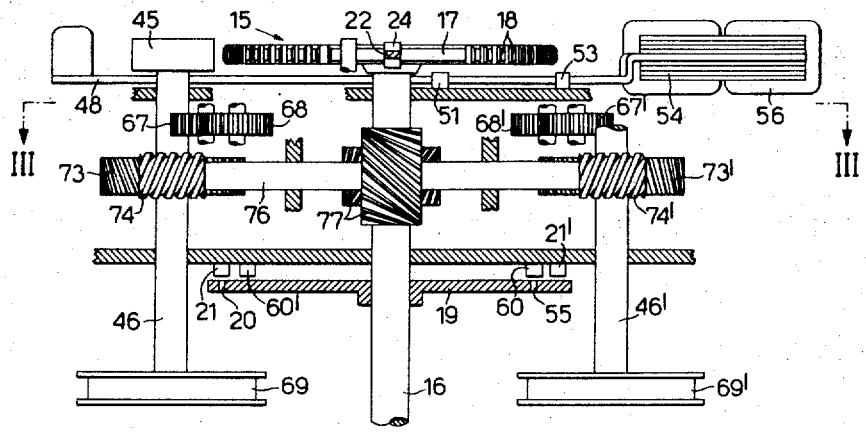
FIG. 2 is a partial vertical sectional view according to the line II—II of FIG. 1.

A starting signal generated by the apparatus controlling he printing device, in concomitance with a pulse generated by the cell 199 upon reading the hole 198 (FIG. ) of the disk 96, energizes the electromagnet 138 (FIG. 2). The lever 132 is now rocked counterclockwise, thus ocking the lever 126 clockwise, whereby the lug 139 becomes temporarily locked in the rocked position by the rm 142 of the bail 143. Now the spring 127 urges the ever 116 to rock clockwise, thus causing through the link 20 the lever 121 (FIG. 11) to contact the cam 124.

When the bevelled surface 125 of the cam 124 reaches he lever 121, the spring 127 (FIG. 12) rocks the levers 15 and 116 clockwise on the pivot 118. Then the pin 113 ushes the member 111 upwards thus rocking the shaft 07 (FIG. 10) counterclockwise, and causing the nut 105 o engage the threaded portion 103 (FIG. 9) of the shaft 01. Furthermore, the bevelled surface 125 (FIG. 12) lisplaces the lever 122 axially leftward, thus compressing he spring 123 (FIG. 9), whereby the lever 122 is disabled.

Now the threaded portion 103 (FIG. 9) through the ut 105 and the shaft 107 displaces the carriage 78 from eft to right at the speed of one letter space during each evolution of the typewheels 15. During this displacement he shaft 107 is locked in the reached angular position hrough the pin 148 cooperating with the axial rib 151 of he plate 193. At each revolution of the typewheels 15 (FIG. 8) each hammer 22 is selectively operated upon eceiving a signal emitted by a suitable memory, in concomitance with the corresponding pulse generated by the ell 197 (FIG. 9) in reading a hole 97 to strike on a elected type of the corresponding typewheel 15 (FIG. 8). Therefore the four typewheels 15 are caused to simultaneously print four portions of the printing line.

When the carriage 78 reaches the middle part of its troke, the hub 110 engages the upper edge of the arm 46 (FIG. 12), thus rocking the bail 143 clockwise. Now he arm 142 of the bail 143 releases the lug 139, whereby he spring 134 restores the lever 126 counterclockwise imultaneously with the levers 115 and 116, which are reurned into their horizontal position. In turn due to its veight the lever 132 returns to contact the stationary pin 36 independently of the restoration of the lever 126, as oon as the electromagnet 138 is deenergized. Since the ever 121 is now returned to the angular position shown n FIG. 11, the spring 123 (FIG. 9) restores the lever 121 xially rightwards.

When the carriage 78 approaches the right end of the rinting line, the pin 114 is engaged by the spherical member 111, which is still locked in the counterclockwise posiion by the rib 151 (FIG. 9), whereby the spring 119 is ow compressed. Then the pin 149 of the shaft 107 encounters the tapered projection 153 which returns the shaft 07 to the central angular position, whereby the nut 105 (FIG. 10) disengages the threaded portion 103. Now the nember 111 (FIG. 9) brings the notch 112 in front of the in 114, which is caused by the spring 119 to snap into he notch 112. The last portion of the stroke of the carriage 78 is helped by the right hand spring urged locking nember 98 which engages the corresponding pin 99 and hen yieldably locks the carriage 78 in the right hand end ositions.

Now the sprocket feed devices 87 cause the paper to be ine spaced. Thereafter a new starting signal energizes the lectromagnet 138, whereby the levers 115 and 116 (FIG. 2) are rocked clockwise as in the preceding case. Since ow the member 111 engages the pin 114 the shaft 107 (FIG. 10) is rotated clockwise and the nut 106 engages he threaded portion 104. The carriage 78 (FIG. 8) now egins to effect a return or leftward movement during which the hammers 22 are controlled by the pulses generated by the cell 197 (FIG. 9) upon reading the holes 97' of the disk 96 in concomitance with the selecting signals given by a suitable memory in a manner known per se.

Near the middle of the printing line the hub 110 (FIG. 12) engages the arm 146 of the bail 143, thus releasing the lever 126. When the carriage 78 approaches the beginning of the line the member 111 (FIG. 9) engages the pin 113 in a manner similar to that of the pin 114. In turn the pin 149 engages the tapered projection 152, thus causing the nut 106 to disengage the threaded portion 104. The carriage 78 is now locked by the left hand locking member 98 while the sprocket feed devices 87 (FIG. 8) cause the paper to be line spaced.

It is intended that many changes, improvements and additions of parts may be made in the described high speed serial printing device without departing from the scope of the invention as defined in the appended claims.

What I claim is:

1. In a high speed serial printing device for teleprinters, accounting machines, and data processing equipments, having a typewheel mounted on a substantially vertical shaft, means for continuously rotating said typewheel, a hammer selectively operable to effect a flying striking of a selected type of said typewheel, a frame for mounting said typewheel and said hammer in an aligned transverse relationship, paper support means for locating the paper between said typewheel and said hammer, and feeding means for causing said paper and said frame to be relatively letter spaced, the improvement comprising:

(a) a first major sector on said typewheel having a set of types peripherally arranged substantially parallel to said shaft, said types being separated by voids, (b) a second minor sector on said typewheel being devoid of types, (c) connecting means for connecting said typewheel to said feeding means to enable said feeding means to effect at a constant speed a feeding movement at least equal to one letter space during one revolution of said typewheel, (d) operating means conditionable for causing said hammer to strike said typewheel, (e) and [a] pulse generating means [comprising a disk rotatable synchronously] *synchronous* with said typewheel [and adapted] to generate in association with each type of said first sector a specifically timed operating pulse to condition said operating means for causing said hammer to strike the progressively more trailing types in respect to the leading types on said first sector at progressively displaced positions with respect to said hammer in the advancing direction of said paper to print during each revolution of said typewheel any type in the range of a predetermined letter space of said paper, even if such paper is effecting said constant speed for being letter spaced.

2. A device according to claim 1, comprising in combination:

(f) a striking face on said hammer having a width the ratio of which with respect to said letter space is equal to the ratio between the length of said first sector and the circumference of said typewheel.

(g) said voids having the minimum width required to prevent said hammer from simultaneously striking two adjacent types, the width of said voids beginning from the leading type to the middle type of said first sector being progressively decreasing, the width of said voids beginning from said middle type to the trailing type of said first sector being progressively increasing.

3. A device according to claim 1, comprising in combination:

(f) a normally deenergized electromagnet comprised in said operating means, (g) an armature drivable by said electromagnet for operating said hammer, (h) a stationary box located at the opposite side of said armature with respect to said electromagnet, (i) and a stack of plates housed in said box for cushioning the shock and reducing the vibration of said armature upon deenergization of said electromagnet, (j) said second sector having an angular expanse at least equal to the product of the angular speed of said typewheel by the time required by said hammer and said armature to become restored upon said deenergization.

4. In a serial printing device for teleprinters, accounting machines and data processing equipments, having a continuously rotatable typewheel and a hammer selectively operable for striking a selected type of said typewheel, the improvement comprising:

(a) a normally deenergized electromagnet, (b) an armature drivable by said electromagnet for operating said hammer, (c) a stationary box located at the opposite side of said armature with respect to said electromagnet, (d) a stack of substantially flat plates housed in said box, said plates having a predetermined small gap therebetween, said armature being spring urged to normally bear against said stack, (e) and timing means for controlling the energization of said electromagnet at the instant when a selected type of said typewheel passes in front of said hammer, said stack due to said gap between adjacent plates being adapted to cushion the shock and to reduce the vibrations of said armature upon deenergization of said electromagnet, thus reducing the time required for restoration of said armature and said hammer.

5. A device according to claim 1, comprising in combination:

(f) at least a further hammer operable independently from said first named hammer, (g) and tape feeding means associated with each one of said hammers for continuously feeding a tape between said typewheel and the associated hammer, whereby at least two different print works may be simultaneously produced.

6. A device according to claim 5, comprising in combination:

(h) a single set of readable elements provided on said [disk] *pulse generating means* in positions corresponding to those of said types on said typewheel, (i) and a reading member associated with each one of said hammers for alternately generating a pulse upon reading each one of said elements.

7. A device according to claim 1, comprising in combination:

(f) a transversely movable carriage mounting said typewheel and said hammer, (g) direction selecting means for causing said feeding means to move said carriage alternatively in opposite directions to enable said hammer and said typewheel to print during both the advancing and the return movement of said carriage, (h) a first set of readable pulse generating elements on said [disk] *pulse generating means,*

(i) a first reading member adapted to read said first set of elements to control the operation of said hammer during said advancing movement, (j) a second set of readable pulse generating elements on said [disk] *pulse generating means,*

(k) and a second reading member adapted to read said second set of elements to control the operation of said hammer during said return movement.

8. A device according to claim 1, comprising in combination:

(f) a transversely movable carriage mounting said typewheel and said hammer, (g) a single shaft having a pair of threaded portions in opposite directions, (h) a pair of nuts associated with said threaded portions and alternately engageable with the associated threaded portion for moving said carriage alternately in opposite directions to enable said hammer and said typewheel to print during both the advancing and the return movement of said carriage.

9. A device according to claim 8, comprising in combination:

(i) a member carrying said nuts and transversely movable bodily with said carriage, (j) and means effective at each end of the printing line for causing said member to alternate said nuts in engaging said threaded portions.

10. A device according to claim 8, comprising in combination:

(i) a rockable member carrying said nuts and transversely movable bodily with said carriage, (j) a swing [lover] *lever* rockable in a constant direction under the control of a starting signal, (k) a pair of elements at the ends of said swing lever and adapted to engage said member at the ends of a printing line for rocking said member alternately in opposite directions, (l) and a cam synchronously rotating with said typewheel to control said swing lever so as to be rocked at a predetermined instant.

11. A device according to claim 7, comprising in combination:

(i) at least a further typewheel, (j) and an associated hammer mounted on said carriage, each one of said typewheels and the associated [shammer bing cause] *hammer being caused* to print a corresponding portion of a printing line.

*12. A high-speed serial line printing device for use with teleprinters, accounting machines, data processing equipment and the like comprising:*

*(a) a frame;*

*(b) a typecarrier mechanism mounted on the frame, said typecarrier mechanism including a series of types and being operable to move the types at constant speed through a closed path in a plane substantially parallel to a line being printed and serially past a printing position which is fixed relative to the frame;*

*(c) a hammer mounted on the frame adjacent said position, said hammer being selectively operable to effect a flying printing of any of said types in response to a corresponding signal;*

*(d) paper support means for supporting a piece of paper at said printing position; means for causing said paper and said frame to be relatively letter spaced at a constant speed in a direction along said line being printed as the types are moved through said closed path at constant speed; and*

*(e) control means operably coupled with said hammer and said type carrier mechanism including means for generating pulses indicating the position of the type carrier mechanism and operating means responsive to the pulses for causing the hammer to strike each of the various types of said series at a respective position displaced from said fixed position a distance and direction determined by the relative location of each type in the series, whereby to register the type, at the time it is struck by the hammer, with a pre-determined letter space of said printing line.*

*13. The printing device of claim 12 further including:*

*(g) at least another typecarrier mechanism mounted on said frame;*

*(h) movement control means for confining the movement of said frame to a distance which is equal to the spacing between said typecarrier mechanisms.*

*14. The printing device of claim 13 further including:*

*(i) means for reversing the movement of said frame so that said frame moves at said constant speed in*

*both directions to enable said hammer and said type-carrier mechanism to print during movement of said frame in both directions.*

References Cited

The following references, cited by the Examiner, are of record in the patented file of this patent or the original patent.

UNITED STATES PATENTS

| | | | |
|---|---|---|---|
| 1,547,150 | 7/1925 | Von Pein | 101—90 X |
| 2,668,870 | 2/1954 | Ridler | 178—34 |
| 2,675,108 | 4/1954 | Ruderfer | 197—12 |
| 2,757,605 | 8/1956 | Dumey | 101—90 X |

| | | | |
|---|---|---|---|
| 2,831,425 | 4/1958 | MacDonald | 101—93 |
| 2,843,243 | 7/1958 | Masterson | 101—93 C |
| 2,936,704 | 5/1960 | Hense | 101—93 |
| 3,128,693 | 4/1964 | Thiemann | 101—93 |
| 3,135,195 | 6/1964 | Potter | 101—93 |
| 3,157,115 | 11/1964 | West et al. | 101—93 |
| 3,199,650 | 8/1965 | Brown et al. | 197—18 |
| 3,331,316 | 7/1957 | Bretti | 101—93 |

WILLIAM B. PENN, Primary Examiner

U.S. Cl. X.R.

101—90; 178—34; 197—18